US00RE43498E

(19) United States
(12) Reissued Patent
Bekey

(10) Patent Number: US RE43,498 E
(45) Date of Reissued Patent: Jul. 3, 2012

(54) ADAPTIVE REFLECTOR ANTENNA AND METHOD OF IMPLEMENTING THE SAME

(75) Inventor: Ivan Bekey, Annandale, VA (US)

(73) Assignee: The Aerospace Corporation, El Segundo, CA (US)

(21) Appl. No.: 11/797,368

(22) Filed: May 2, 2007

Related U.S. Patent Documents

Reissue of:
(64) Patent No.: 6,888,515
Issued: May 3, 2005
Appl. No.: 10/404,871
Filed: Mar. 31, 2003

(51) Int. Cl.
*H01Q 15/14* (2006.01)
*H01Q 15/20* (2006.01)

(52) U.S. Cl. ..... 343/912; 343/915; 343/795; 343/840

(58) Field of Classification Search ..... 343/912, 343/915, 795, 810, 700 MS, 840, 754, 757, 343/775, 781 P
See application file for complete search history.

(56) References Cited

U.S. PATENT DOCUMENTS

| | | | | |
|---|---|---|---|---|
| 6,188,160 | B1 | 2/2001 | Main et al. | 310/314 |
| 6,266,024 | B1 * | 7/2001 | Ramanujam et al. | 343/781 CA |
| 6,297,579 | B1 | 10/2001 | Martin et al. | 310/330 |
| 6,720,936 | B1 * | 4/2004 | Koolish et al. | 343/910 |
| 6,728,024 | B2 * | 4/2004 | Ribak | 359/299 |

OTHER PUBLICATIONS

J. Main et al., "Noncontact Shape Control of Membrane Mirrors," University of Kentucky, Department of Mechanical Engineering, Mar. 19, 1999.
C. Clayton, "Large Space Optics," *LEOS newsletter*, vol. 13, No. 4, Aug. 1999.
EurekAlert!, "New deployable thin-film, ultralight mirror may be future of space telescopes and surveillance satellites," May 16, 2000.

* cited by examiner

*Primary Examiner* — Hoang V Nguyen
(74) *Attorney, Agent, or Firm* — Connolly Bove Lodge & Hutz LLP

(57) ABSTRACT

An adaptive reflector antenna includes an adaptive reflector and a mechanism for simultaneously effecting feed rotation and shape change for the adaptive reflector so as to maintain antenna performance with large scan angles while simultaneously reducing weight, complexity, and cost.

36 Claims, 19 Drawing Sheets

CONSTRUCTION OF ADAPTIVE REFLECTOR FOR GMTI

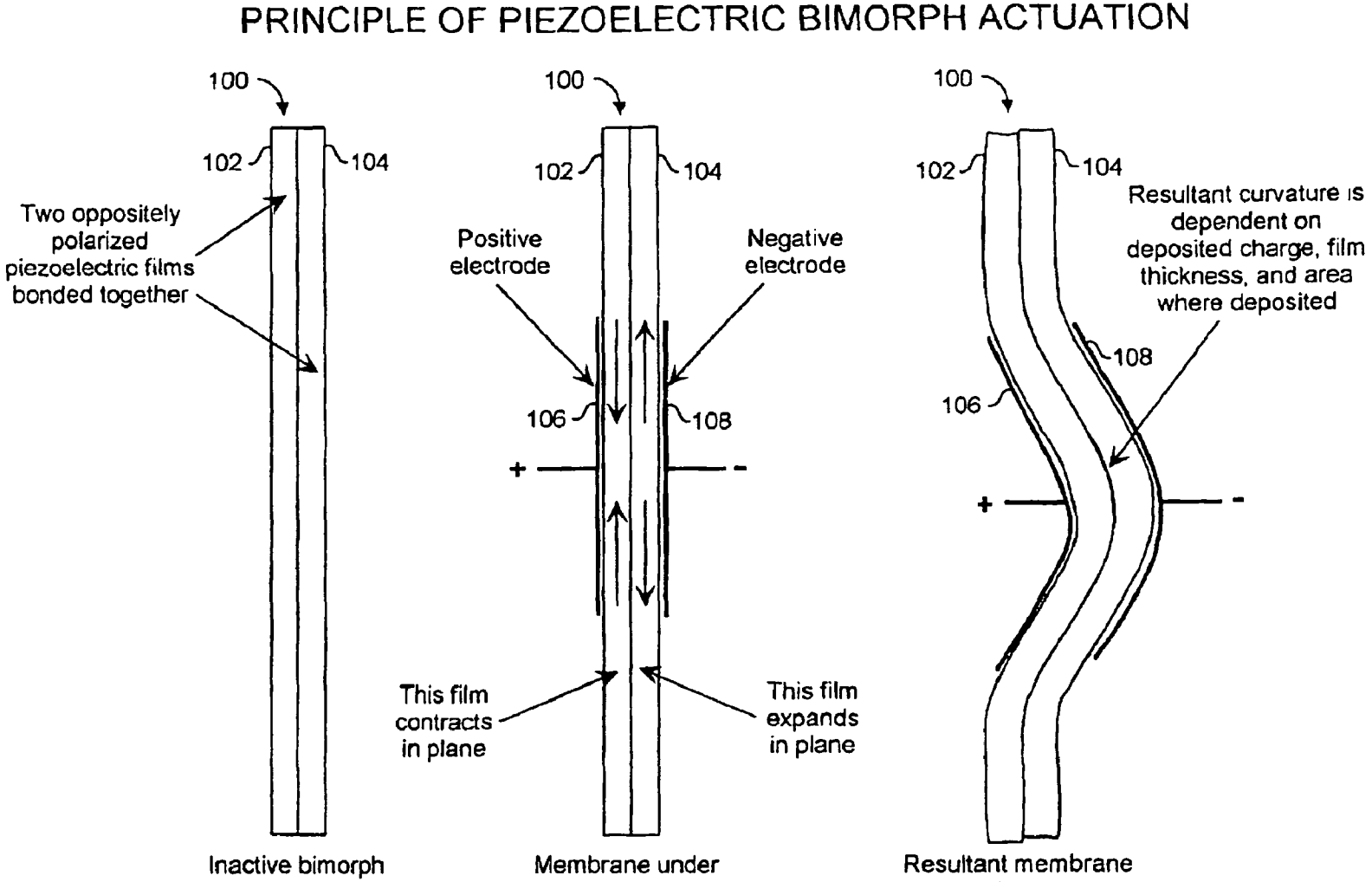
PRINCIPLE OF PIEZOELECTRIC BIMORPH ACTUATION
100
102
104
Two oppositely polarized piezoelectric films bonded together
Inactive bimorph membrane
FIG. 1A
Positive electrode
106
Negative electrode
108
This film contracts in plane
This film expands in plane
Membrane under electric potential
FIG. 1B
Resultant curvature is dependent on deposited charge, film thickness, and area where deposited
Resultant membrane shape
FIG. 1C EQUIVALENCE OF ACTUATING METHODS
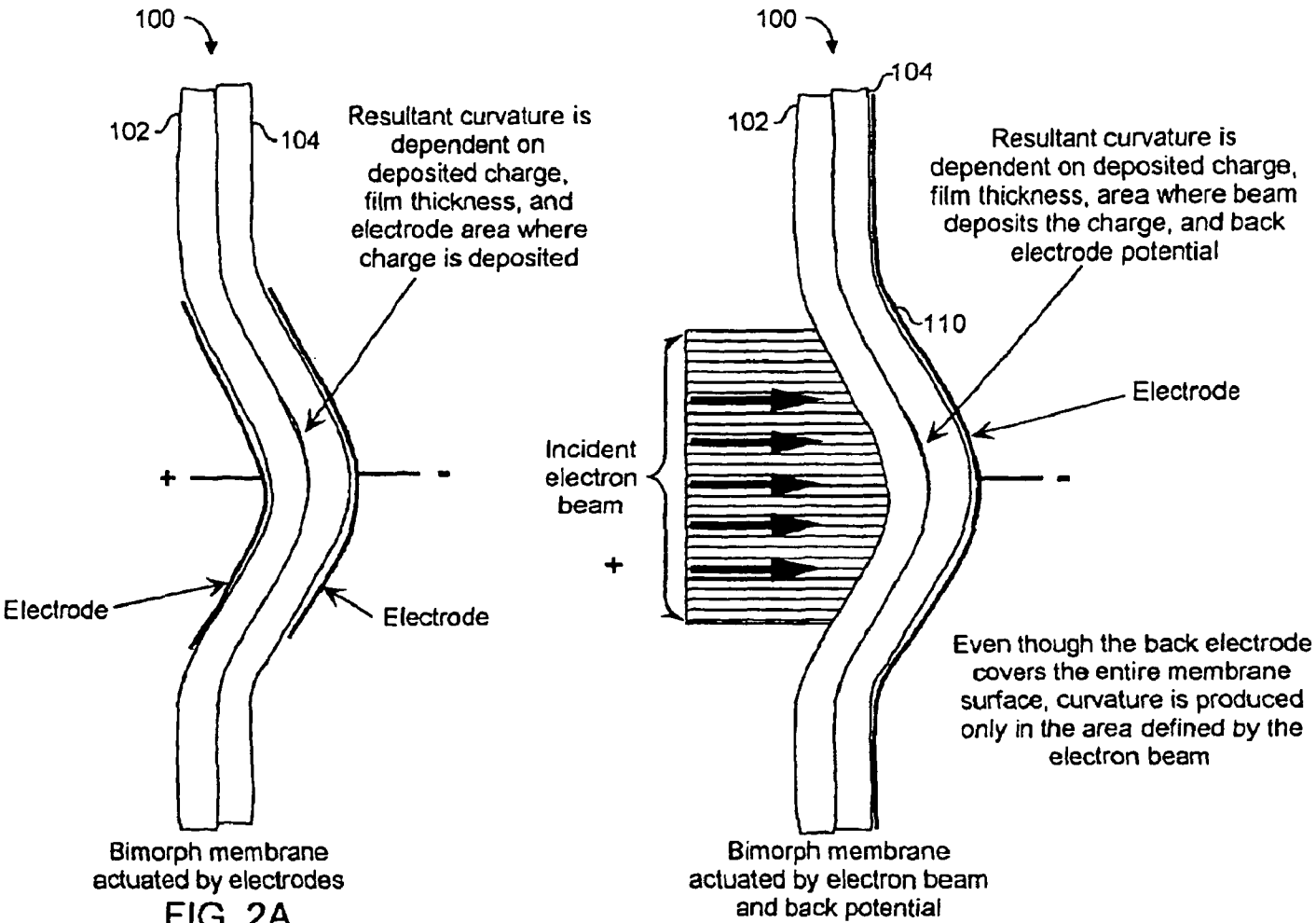

CORRECTION OF MEMBRANE ERRORS
1
2
3
4
Beam scan
Incident electron beam
Assumed initial shape of piezoelectric bimorph membrane Charge distribution deposited in membrane by beam-defined back potential Curvature distribution induced in bimorph membrane Idealized resultant membrane shape

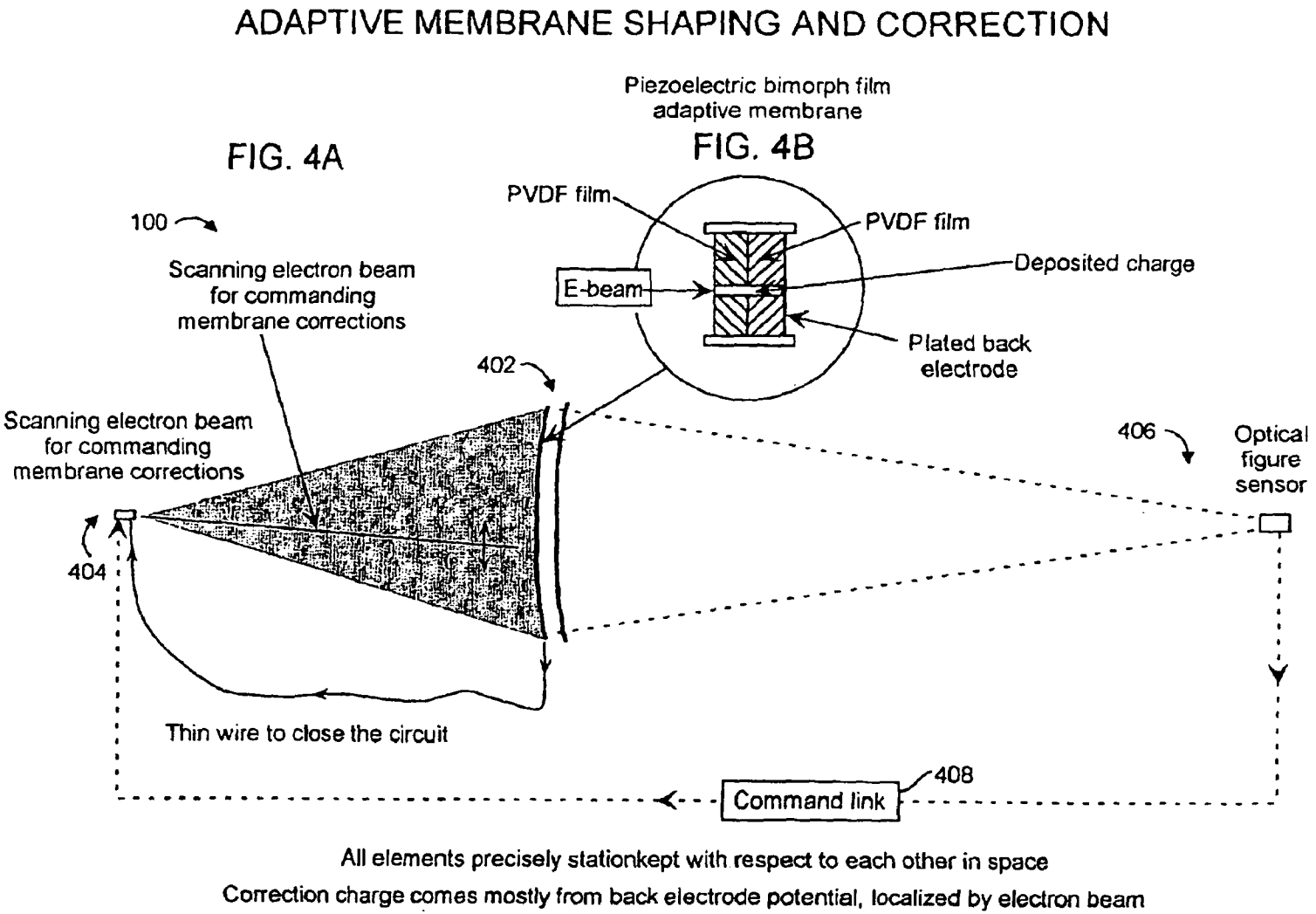
ADAPTIVE MEMBRANE SHAPING AND CORRECTION
FIG. 4A
FIG. 4B
Piezoelectric bimorph film adaptive membrane
PVDF film
Deposited charge
Plated back electrode
PVDF film
E-beam
100
402
404
406
408
Optical figure sensor
Command link
Scanning electron beam for commanding membrane corrections
Scanning electron beam for commanding membrane corrections
Thin wire to close the circuit
All elements precisely stationkept with respect to each other in space
Correction charge comes mostly from back electrode potential, localized by electron beam ADAPTIVE MEMBRANE ANTENNA REFLECTOR
Not to scale
Membrane cross section
Piezoelectric bimorph substrate film layers
Deposited conductive reflector, λ/2 grid spacing
Plated back surface electrode
504
502

502
504
Conductive grid reflector 508
506
502
Thin wire to close the circuit
Scanning electron beam for commanding membrane corrections

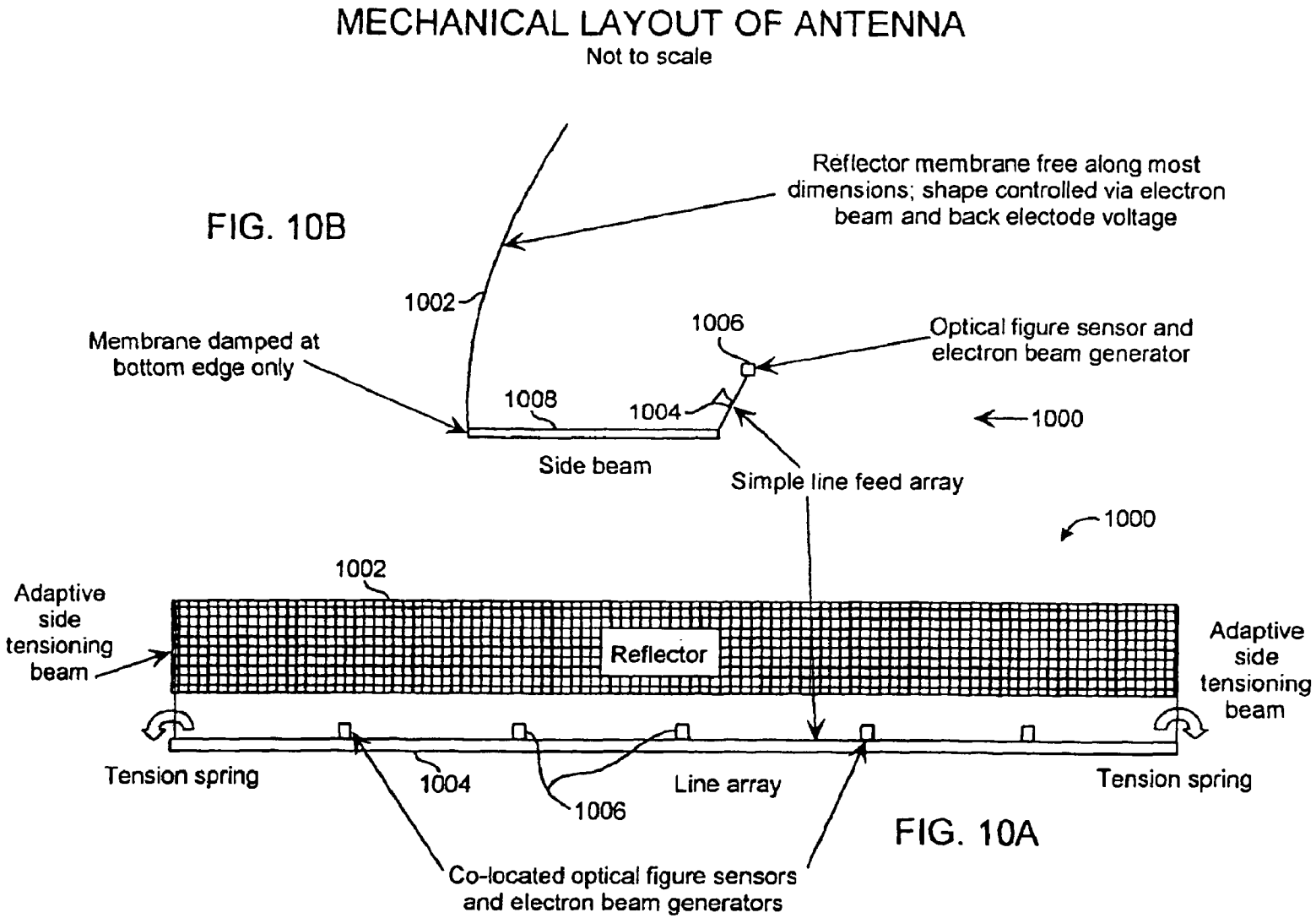
MECHANICAL LAYOUT OF ANTENNA
Not to scale
Reflector membrane free along most dimensions; shape controlled via electron beam and back electode voltage
Optical figure sensor and electron beam generator
1000
1006
1004
1008
1002
Side beam
Simple line feed array
Membrane damped at bottom edge only
FIG. 10B
1000
Adaptive side tensioning beam
Tension spring
Reflector
Line array
1006
1004
1002
Co-located optical figure sensors and electron beam generators
Tension spring
Adaptive side tensioning beam
FIG. 10A

ALTERNATE #1 STRUCTURAL CONFIGURATION

With a few beams positioning the bottom membrane edge

OPTIONS FOR ROTATING THE ILLUMINATING BEAM

SHAPING OF 10 x 100 m. X-BAND REFLECTOR

CONSTRUCTION OF ADAPTIVE REFLECTOR FOR GMTI

SHAPING OF 50 x 300 m. L-BAND REFLECTOR

ADAPTIVE REFLECTOR ANTENNA AND METHOD OF IMPLEMENTING THE SAME

Matter enclosed in heavy brackets [ ] appears in the original patent but forms no part of this reissue specification; matter printed in italics indicates the additions made by reissue.

STATEMENT OF GOVERNMENT INTEREST

The invention was made with Government support under contract F04701-00-C-0009 by the Department of the Air Force. The Government has certain rights in the invention.

BACKGROUND OF THE INVENTION

Space-based radar and communications system designs arc generally limited by power-aperture product for transmissions and by the antenna aperture for receptions. In both types of systems the beamwidth becomes narrower as the aperture becomes larger, forcing the beam to be scanned if larger coverage is desired, as it often is. Reflector type antennas are notoriously limited in the scan angle that they can attain, to about 10 to at most 20 beamwidths before beam distortion and growth in sidelobes becomes so large as to render performance unacceptable. Phased array antennas do not suffer the same limitations, but are in general much more complex, heavy, and expensive than the same aperture reflector antennas due to the number of components and the strict positional requirements of the elements for their functioning. This is especially true for space based radar systems that detect, identify and track targets near the Earth's surface, that require large antenna apertures together with fine sidelobe control while attaining large beam scan angles which are needed in order to achieve adequate signal-to-noise ratio and clutter rejection to perform moving target detection.

Thus, it would be desirable to be able to provide very large space antennas that are free of the limited scan angle of reflector or array-fed reflector antennas, yet are much lighter and less complex than pure electronically steerable antennas. By way of example, it would be desirable to be able to implement antennas with aperture in the tens to hundreds of meters while simultaneously having aerial densities of less than 1 kg/square meter and yet be able to scan their beams dozens if not hundreds of beamwidths. In addition it would be very desirable to simplify the feeds of such antennas and their associated data processing units to both reduce weight, cost, and complexity and increase reliability. The resulting reduction in power, processing, complexity and weight requirements would, in turn, provide for a significantly lighter and less expensive spacecraft and for a smaller launcher, without compromising space system performance. This application describes novel means to implement such antennas, regardless of their application.

BRIEF DESCRIPTION OF THE DRAWINGS

Detailed description of embodiments of the invention will be made with reference to the accompanying drawings:

FIGS. 1A–1C illustrate the principle of piezoelectric bimorph actuation;

FIGS. 2A and 2B illustrate bimorph actuation by electrodes and by electron beam and back potential, respectively;

FIG. 4A illustrates a system incorporating adaptive membrane shaping and correction;

FIG. 4B is an enlarged cross-sectional view of the piezoelectric bimorph film adaptive membrane of FIG. 4A;

FIGS. 10A and 10B show front and side views of an embodiment of an antenna layout according to the present invention;

DETAILED DESCRIPTION

Figures 3A, 3B, 3C, 3D:
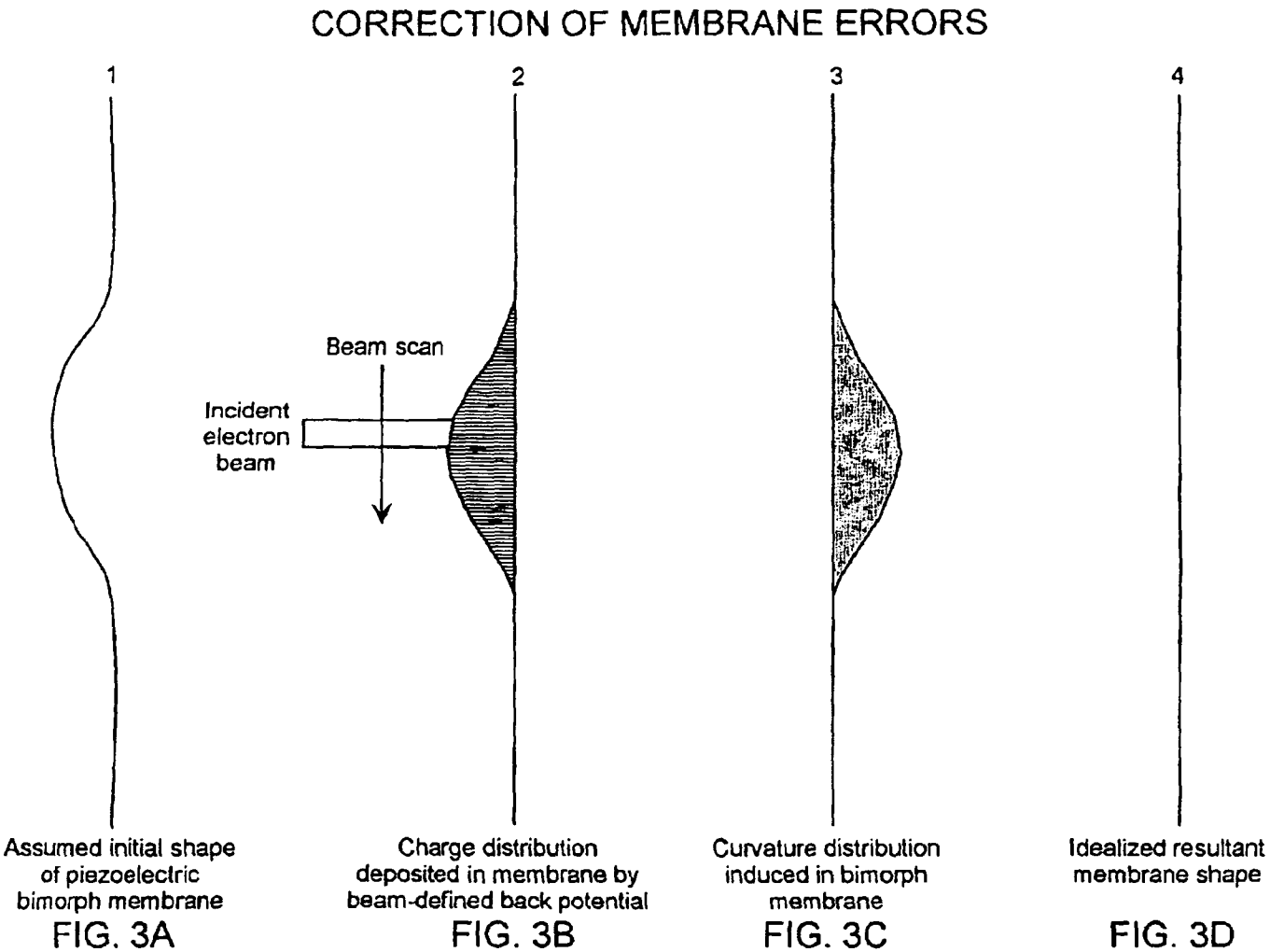
FIGS. 3A–3D illustrate the correction of bimorph membrane errors employing a scanned electron beam.

The following is a detailed description of the best presently known mode of carrying out the invention. This description is not to be taken in a limiting sense, but is made merely for the purpose of illustrating the general principles of the invention.

The present invention pertains to an adaptive reflector antenna including an adaptive reflector and a mechanism for simultaneously effecting feed rotation and shape change for the adaptive reflector. According to the present invention, various implementations of adaptive reflectors allow the shape of very large antennas to be adaptively controlled. Adaptive reflector antennas according to the present invention have the advantages of very wide scan angle, very light weight, essentially unlimited size, and a very simple and light feed, which can greatly simplify associated electronics hardware and information processing systems. For space based radar applications, the net result is a great savings in total system weight and costs and a simultaneous increase in system performance. There are many commercial as well as government applications that could benefit from this technology including, but not limited to, space based radar, communications, ELINT, navigation, data collection, ground sensing, and other antennas. It could also be as useful in airborne as well as ground based radar, communications, sensing, and other applications so long as it were enclosed in a radome to eliminate wind effects.

Referring to FIGS. 1A–1C, the principle of piezoelectric bimorph actuation is explained below. In FIG. 1A, a bimorph membrane 100 is shown in an inactive state. The bimorph membrane includes oppositely polarized piezoelectric films 102 and 104 which are bonded together. In FIG. 1B, the bimorph membrane 100 is shown with electrodes 106 and 108 positioned adjacent films 102 and 104, respectively. With an electric potential applied across the electrodes 106 and 108 as shown, the film 102 contracts in plane and the film 104 expands in plane resulting in the membrane shape shown in FIG. 1C (and in FIG. 2A). The resultant curvature is dependent on deposited charge, film thickness, and electrode area where charge is deposited. In FIG. 2B, an alternative membrane actuating approach is illustrated wherein the bimorph membrane 100 is actuated by an electron beam incident upon the film 102 and a back potential applied to a back electrode 110 covering the entire membrane surface adjacent the film 104. As illustrated, curvature is produced only in the area defined by the electron beam.

FIGS. 3A–3D illustrate the correction of bimorph membrane errors employing a scanned electron beam. For an initial shape (FIG. 3A) of a piezoelectric bimorph membrane, a scanned electron beam incident upon the membrane deposits a charge distribution (FIG. 3B). The curvature distribution (FIG. 3C) induced in the bimorph membrane adjusts the initial shape to provide an idealized resultant membrane shape (FIG. 3D).

FIGS. 4A and 4B illustrate a system 400 incorporating adaptive membrane shaping and correction. The system 400 includes a piezoelectric bimorph film adaptive membrane 402, an electron beam and back potential generator 404, and an optical figure sensor 406 configured as shown. The piezoelectric bimorph film adaptive membrane 402 is formed, for example, with polyvinylindene fluoride (PVDF) in a bimorph configuration, and has a plated back surface electrode. The electron beam and back potential generator 404 makes membrane corrections by scanning the electron beam; the correction charge comes mostly from the back electrode potential, localized by the electron beam. The optical figure sensor 406 provides its output to the electron beam and back potential generator 404 via a command link 408, so that a closed loop control system is implemented that sets and maintains the reflector curvature and shape in the presence of disturbances, conforming at all times to the desired reference figure imposed on the system. All elements of the system 400 may be connected by structure or precisely stationkept with respect to each other in space.

Figures 5A, 5B, 5C:
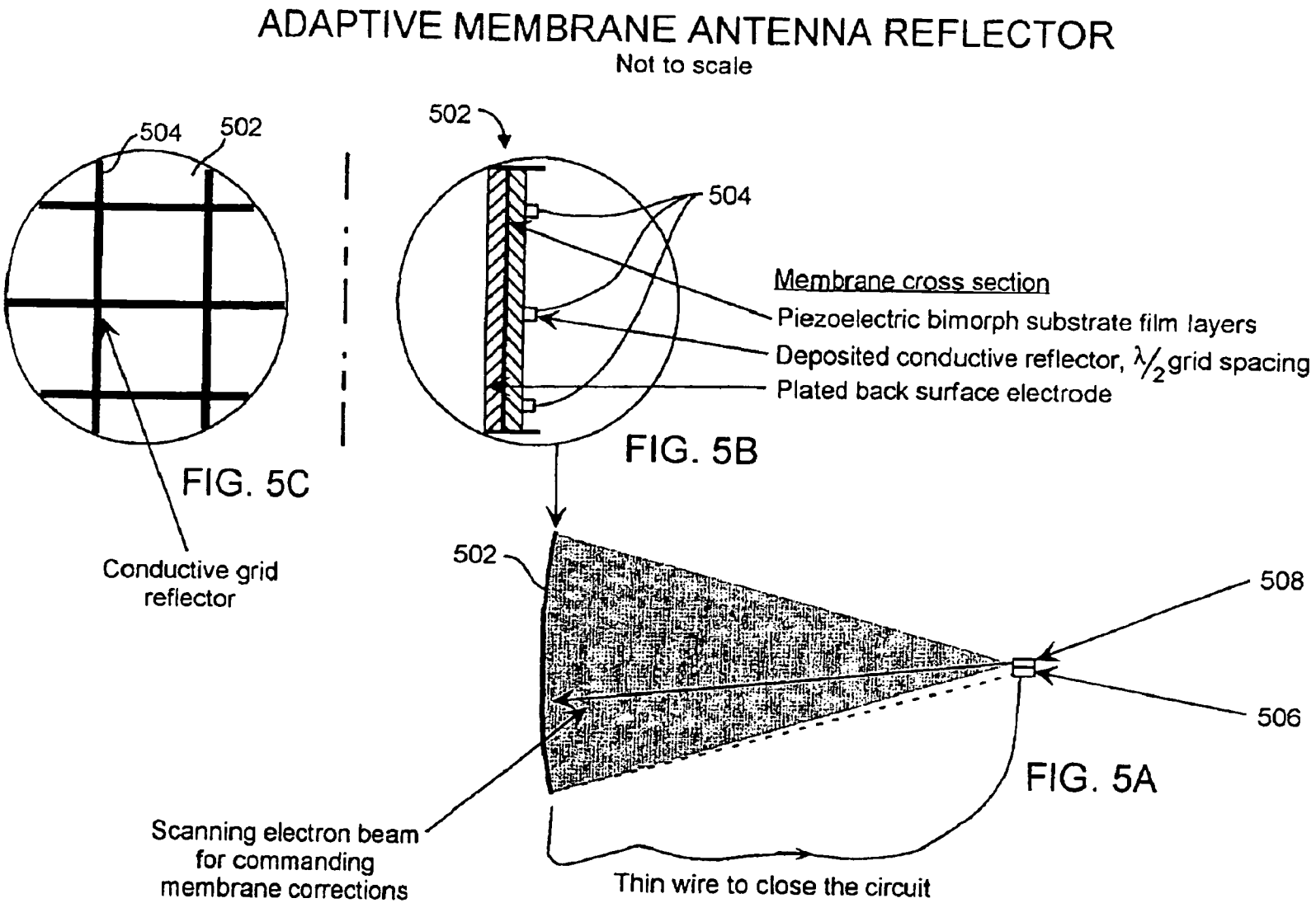
FIG. 5A illustrates an adaptive reflective antenna.
FIG. 5B is an enlarged cross-sectional view of the membrane of FIG. 5A.
FIG. 5C is a front view of the reflector structure of FIG. 5B.

Referring to FIGS. 5A–5C, an adaptive reflective antenna 500 includes a membrane 502 including a bimorph substrate, a reflector structure 504 formed over the bimorph substrate, an optical figure sensor 506, and a beam scanning mechanism 508 configured to adaptively actuate (in real time) a shape of the membrane 502 in response to an output of the optical figure sensor 506. The reflector shape can thus be set by setting a reference shape for the figure sensor, e.g., by software and/or command. In some desired embodiments of the present invention, the membrane 502 is configurable as a parabolic cylinder antenna. It should be appreciated, however, that other antenna geometries could also benefit from the principles of the present invention. The membrane 502 has a plated back surface electrode on the side of the piezoelectric bimorph substrate film layers opposite from where the reflector structure 504 is positioned. In this embodiment of the present invention, the reflector structure 504 is a conductive grid formed with about a half-wavelength grid spacing (FIGS. 5B and 5C). The grid reflector saves a large amount of weight without affecting radio frequency (RF) reflector performance. The beam scanning mechanism 508 includes (or remotely accesses) processing functionality and controls scanning of the electron beam to change or correct the shape of the membrane 502. See, e.g., U.S. Pat. No. 6,188,160 to Main et al. which is incorporated herein by reference.

A method for implementing an adaptive reflector antenna according to the present invention includes the step of operatively coupling line feed rotation and reflector shaping for an adaptive off-axis reflector of a parabolic cylinder antenna such that each reflector shaping creates an identical off-axis parabolic shape for the portion of the reflector then illuminated by the line feed rotation. In various embodiments of the present invention, the step of operatively coupling line feed rotation and reflector shaping includes co-locating optical figure sensors and electron beam generators of the adaptive reflector antenna (as shown in FIG. 5A). In various embodiments of the present invention, a mechanism for simultaneously effecting feed rotation and shape change is realized via an illuminating beam scanner which adjusts a shape of the adaptive reflector in response to an optical figure sensor. The mechanism for simultaneously effecting feed rotation and shape change is configured such that illuminated reflector shape is controlled as offset angle and tilt are applied so that the feed always sees an on-axis reflector of the original shape as scan angle is changed, such that antenna gain, pattern, and sidelobe levels remain constant as the scan angle is increased from zero. As discussed below, the parabolic cylinder antenna with adaptive off-axis reflector of the present invention provides significant benefits when compared to a conventional off-axis array-fed parabolic cylinder reflector antenna.

Figure 6:
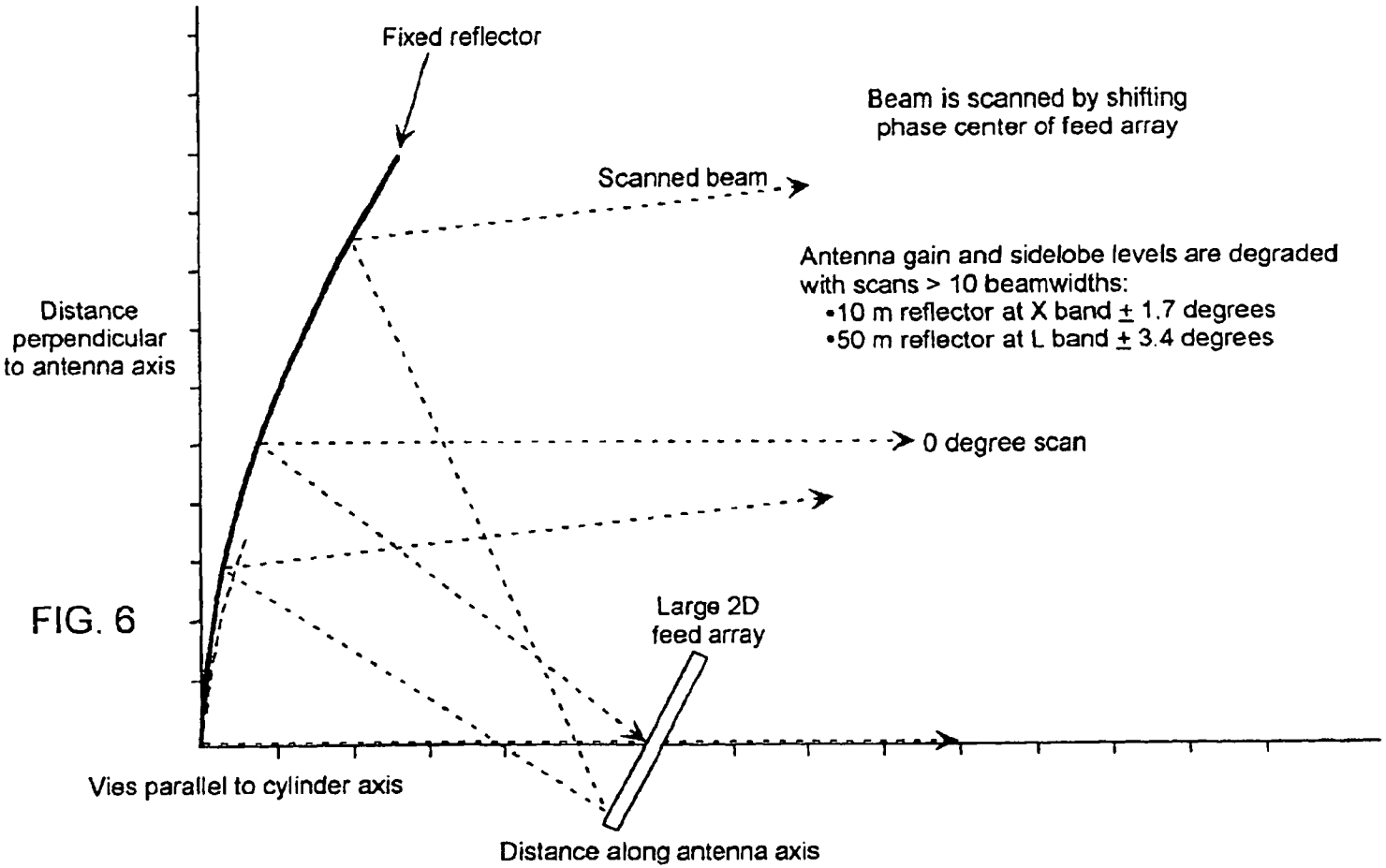
FIG. 6 illustrates operational principles of a conventional off-axis array-fed parabolic cylinder reflector antenna.

FIG. 6 illustrates operational principles of a conventional off-axis array-fed parabolic cylinder reflector antenna. In operation, the beam is scanned by shifting the phase center of a large two-dimensional (2D) feed array. Antenna gain and sidelobe levels are degraded with scans >10 beamwidths: 10 m reflector at X band ±1.7 degrees; 50 m reflector at L band ±3.4 degrees.

Figure 7:
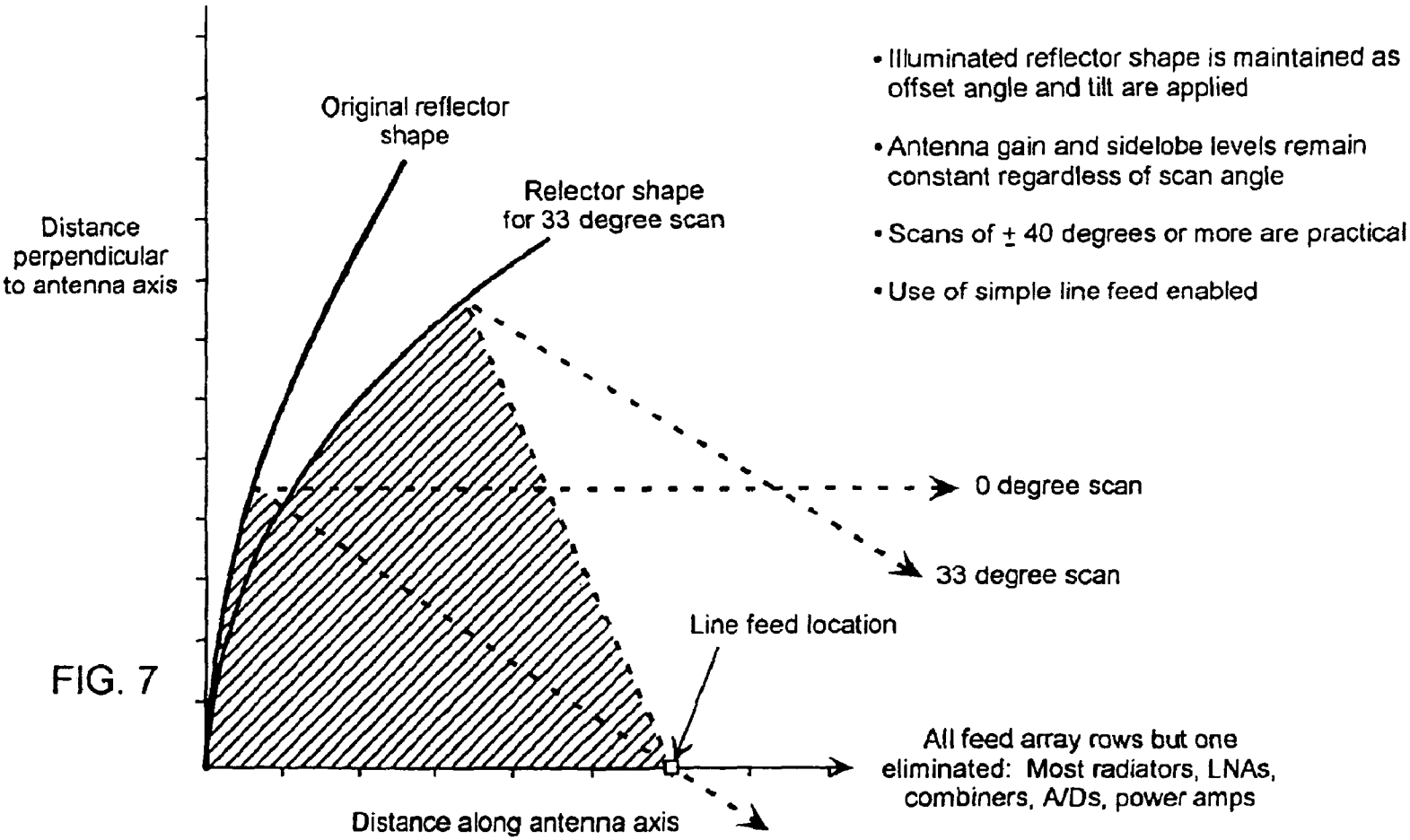
FIG. 7 illustrates operational principles of a parabolic cylinder antenna with adaptive off-axis reflector according to the present invention.

FIG. 7 illustrates operational principles of a parabolic cylinder antenna with adaptive off-axis reflector according to the present invention. The feed can be a simple and lightweight linear array (such as a slotted waveguide) which is parallel to the reflector axis and rotated about its long axis. Elimination of the 2D feed saves large quantities of weight, electronics, and complexity, as well as makes possible much less information processing due to the better beam quality which produces less clutter and better target detection and tracking performance. In operation, illuminated reflector shape is maintained as offset angle and tilt are applied. Antenna gain and sidelobe levels remain constant regardless of scan angle (scans of ±40 degrees are practical).

Figure 8:
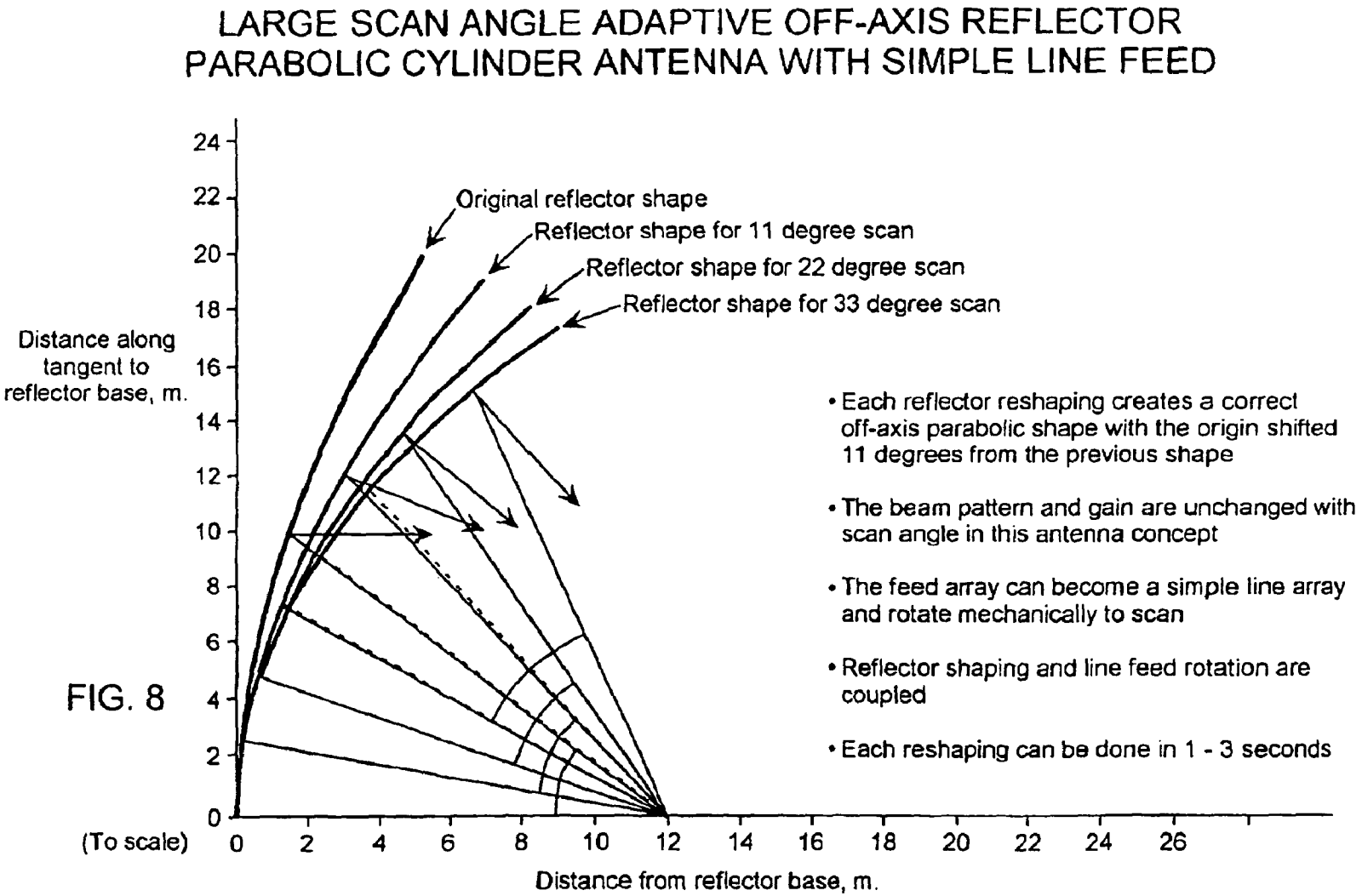
FIG. 8 illustrates reflector reshaping for a large scan angle adaptive off-axis reflector parabolic cylinder antenna with simple line feed according to the present invention.

FIG. 8 illustrates reflector reshaping for a large scan angle adaptive off-axis reflector parabolic cylinder antenna with simple line feed according to the present invention. Reflector shaping and line feed rotation are coupled such that beam pattern and gain are unchanged with scan angle. As discussed above, the feed array can be simple line array and rotate mechanically to scan. In this example, each reflector reshaping creates a correct off-axis parabolic shape with the origin shifted 11 degrees from the previous shape, and each reshaping can be done in 1–3 seconds. In order to scan the angle at which the wave exits the antenna, the feed array is rotated to the desired angle and the shape of the reflector is changed so that the portion of the reflector that the feed now illuminates assumes an identical shape and distance from the feed to those it had before the scan. As a result, the beam pattern is not degraded at all and is identical to that before the scan, except that it now exits at an angle from the antenna.

Figure 9:
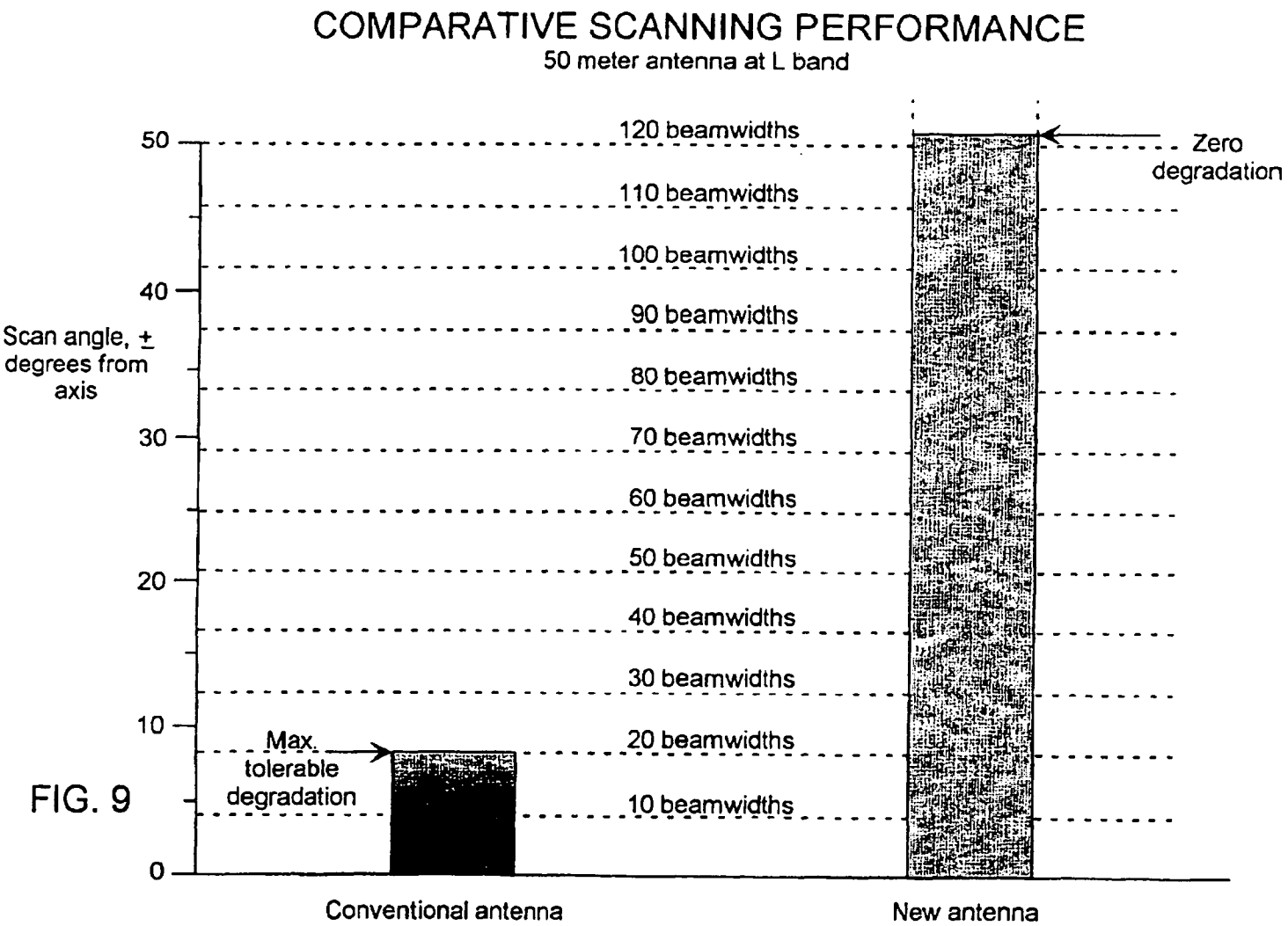
FIG. 9 shows comparative scanning performance for a conventional off-axis array-fed parabolic cylinder reflector antenna and a parabolic cylinder antenna with adaptive off-axis reflector according to the present invention.

FIG. 9 shows comparative scanning performance (50 m antenna at L band) for a conventional off-axis array-fed parabolic cylinder reflector antenna and a parabolic cylinder antenna with adaptive off-axis reflector according to the present invention. With the conventional antenna, there is a limit of approximately 10 to 20 antenna beamwidths before unacceptable beam degradation sets in. With the antenna of the present invention, scan angles of at least 120 antenna beamwidths are possible with no degradation in beam pattern.

In an embodiment of the present invention illustrated in FIGS. 10A and 10B, an antenna 1000 includes a reflector membrane 1002, a line array 1004, co-located optical figure sensors and electron beam generators 1006, and a side beam 1008 configured as shown. As illustrated, the reflector membrane 1002 is clamped at the bottom edge only, thus the reflector membrane 1002 is free along most dimensions. Optionally, adaptive side tensioning beams can be provided. The shape of the reflector membrane 1002 is controlled, as discussed above, via electron beam and back electrode potential.

Figure 11:
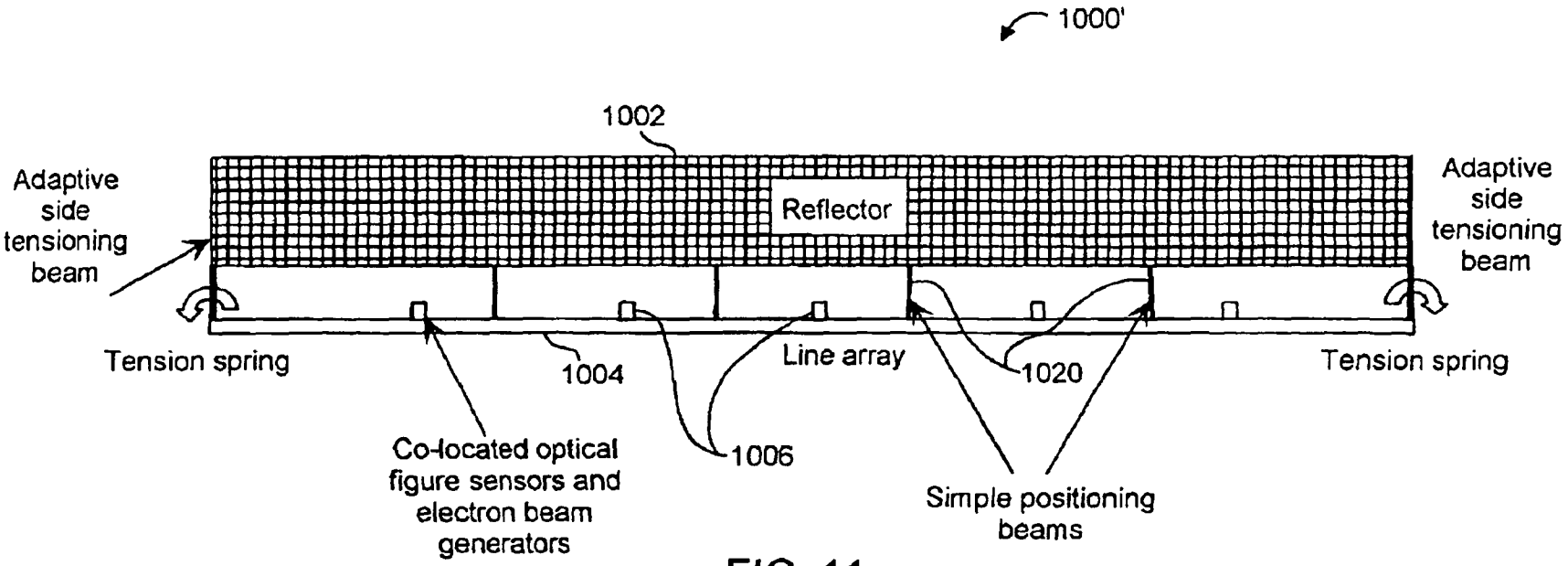
FIG. 11 shows a front view of first alternative embodiment of an antenna layout according to the present invention.

In another embodiment of the present invention illustrated in FIG. 11, an antenna 1000' is identical to the antenna 1000 (FIGS. 10A and 10B) except that it additionally includes a plurality of beams 1020 positioning the bottom edge of the reflector membrane 1002 as shown.

Figure 12:
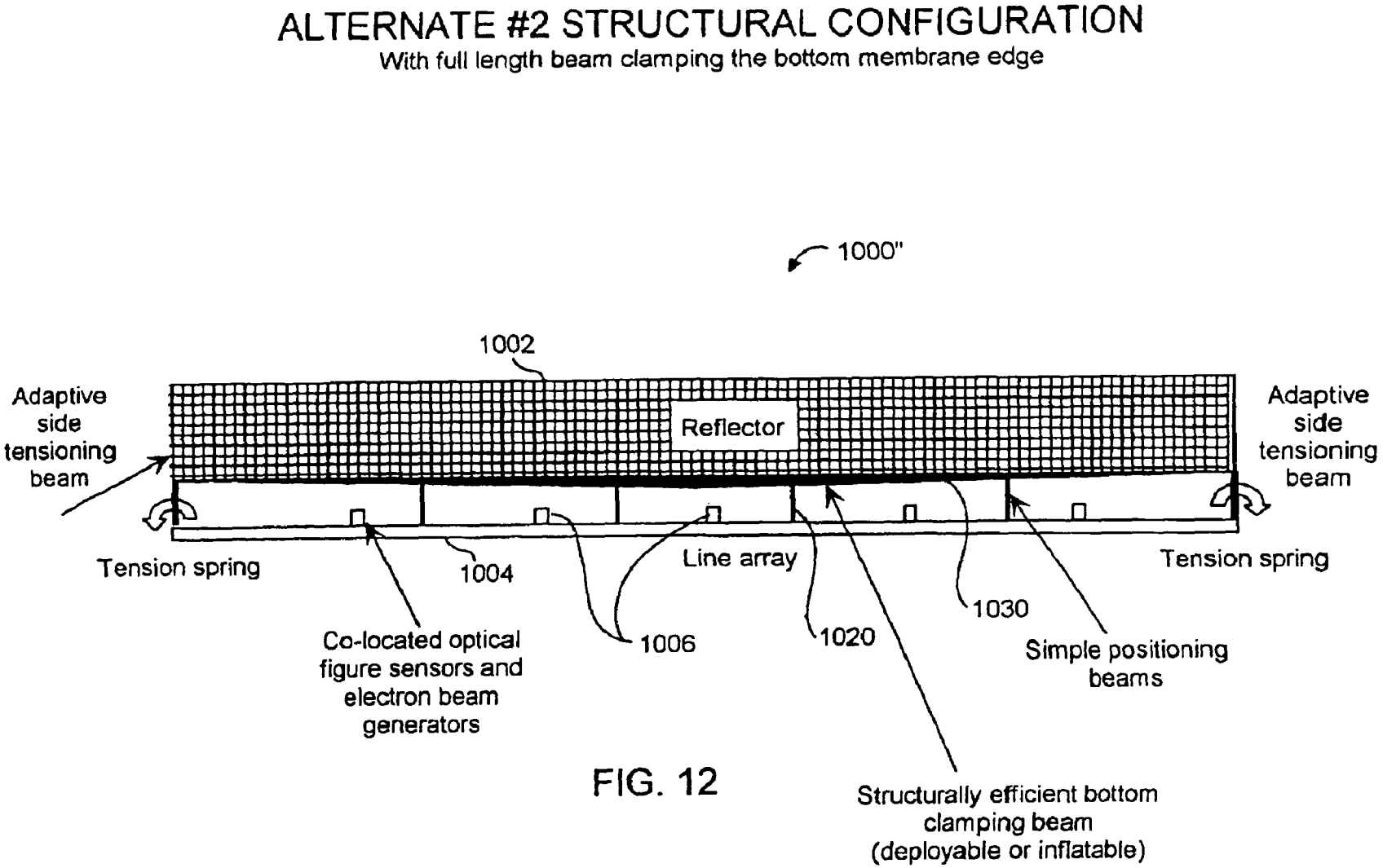
FIG. 12 shows a front view of a second alternative embodiment of an antenna layout according to the present invention.

In still another embodiment of the present invention illustrated in FIG. 12, an antenna 1000" is identical to the antenna 1000' (FIG. 11) except that it additionally includes a structurally efficient bottom clamping beam 1030 positioned at the bottom edge of the reflector membrane 1002 as shown. The (full length) clamping beam 1030 can be deployable or inflatable.

Figure 13A:
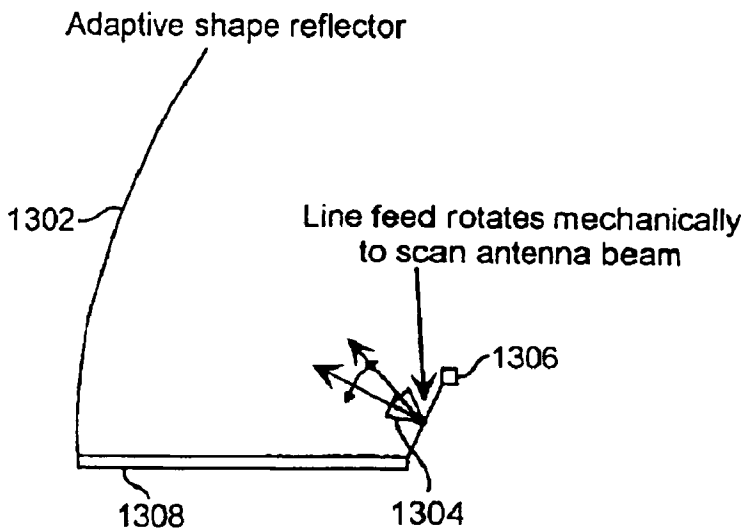
FIG. 13A illustrates a mechanically rotating line feed approach to scanning the antenna beam according to the present invention.
Figure 13B:
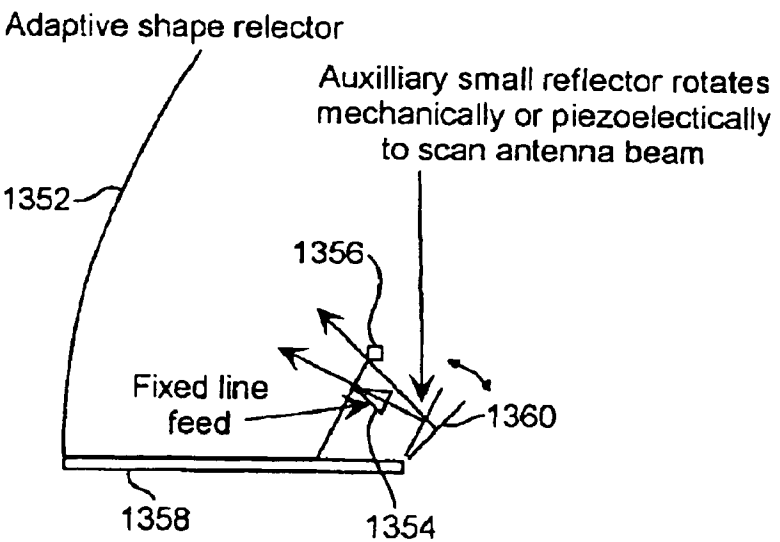
FIG. 13B illustrates a fixed line feed with auxiliary rotating reflector approach to scanning the antenna beam according to the present invention.

According to the present invention, various approaches to scanning the antenna beam can be employed. For example, FIG. 13A illustrates an antenna 1300 that employs a mechanically rotating line feed approach. The antenna 1300 includes a reflector membrane 1302, a mechanically rotating line feed 1304, co-located optical figure sensors and electron beam generators 1306, and a side beam 1308 configured as shown. FIG. 13B illustrates an antenna 1350 that employs a fixed line feed with auxiliary rotating reflector approach. The antenna 1350 includes a reflector membrane 1352, a fixed line feed 1354, co-located optical figure sensors and electron beam generators 1356, a side beam 1358, and a rotatable auxiliary reflector 1360 configured as shown. By way of example, the auxiliary reflector 1360 can be configured to rotate mechanically or piezoelectrically. Thus, the illuminating beam scanner configured to adjust a shape of an adaptive reflector in response to an optical figure sensor can be realized in various forms. It should be appreciated that still other approaches to scanning the antenna beam can be employed.

Figure 15A:
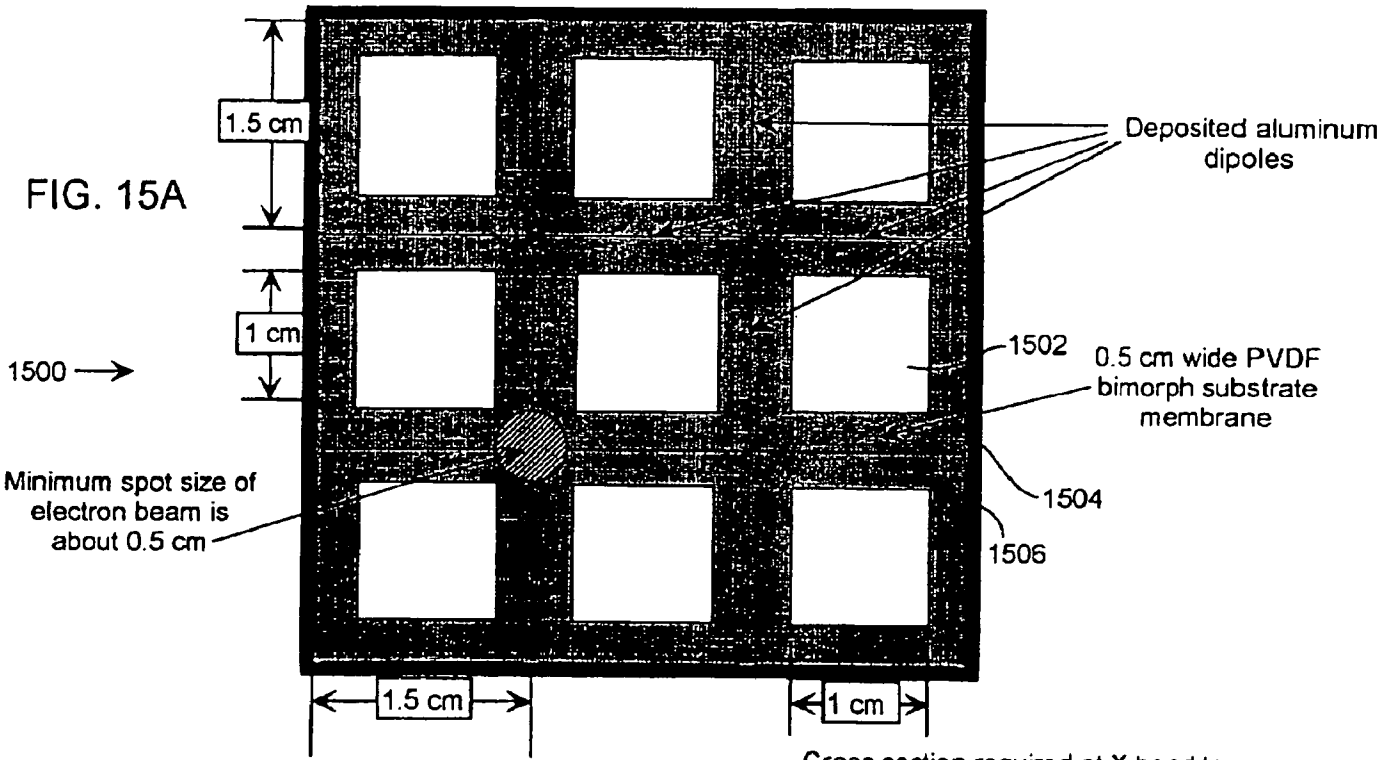
FIGS. 15A and 15B illustrate an example of a ground moving target indication (GMTI) X-band adaptive reflector construction according to the present invention.
Figure 15B:
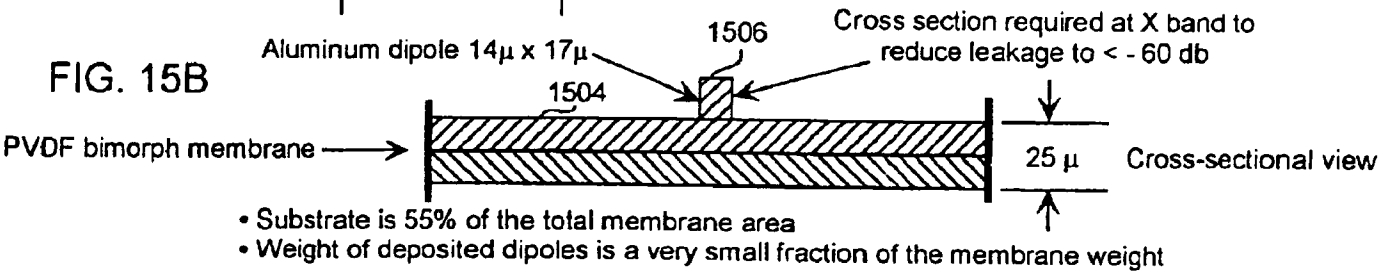

FIGS. 15A and 15B illustrate an example of a ground moving target indication (GMTI) X-band adaptive reflector construction according to the present invention. An adaptive reflector 1500 suitable for GMTI X-band includes a membrane 1502, with a bimorph substrate 1504, and a reflector structure 1506 formed over the bimorph substrate 1504. In this example, the substrate 1504 is 55% of the total membrane area, and is formed in a grid configuration as shown from 0.5 cm wide PVDF strips with a matte surface finish for reflecting the figure sensor laser. For an antenna employing the adaptive reflector 1500, the beam scanning mechanism is configured to generate an electron beam with a minimum spot size that is a function of the width of the strips. In this example, the minimum spot size of the electron beam is about 0.5 cm. The reflector structure 1506 is formed as a plurality of dipoles centrally positioned along portions of the bimorph substrate 1504 as shown. In this example, the dipoles are deposited aluminum and have a cross-section (14μ×17μ) which, at X-band, reduces leakage to <−60 dB.

The above-described GMTI adaptive reflector is suitable for a 10 m×100 m array-fed (simple one-dimensional line array) parabolic cylinder reflector that is attached to the feed with minimal structure only at its bottom edge. Multiple phase centers may be retained in the line array if beneficial. For an antenna employing such an adaptive reflector, less clutter processing is required: Space-Time Adaptive Processing (STAP) is reduced or eliminated. This adaptive reflector also results in smaller Minimum Detectable Velocity of targets and in improved tactical target tracking. An antenna employing such an adaptive reflector is lighter and less costly: fewer Low Noise Amplifiers (LNAs), no beamforming hardware or electronics. Consequently, spacecraft design is simplified and significant weight and cost savings are likely.

Operating at X-band stresses surface requirements, and a great amount of surface accuracy is needed to avoid loss of gain. An imperfect surface scatters some signal away from the focus and produces a loss known as the Ruze loss after John Ruze, who first derived the expression $$L=\exp(-(\pi d/\lambda)^2)$$

where L is the loss factor, d is the root-mean-square (rms) deviation from a parabola, and λ is the wavelength. Rms surface roughness of 0.75 mm is needed to limit gain reduction to <1 db. This is an accuracy of 0.00075 m in 100 m, or 1 part in 133,000. This is extremely difficult for passive structures: requires active systems. As discussed below, X-band operation is an exemplary application for the adaptive reflector technology of the present invention.

Figure 14:
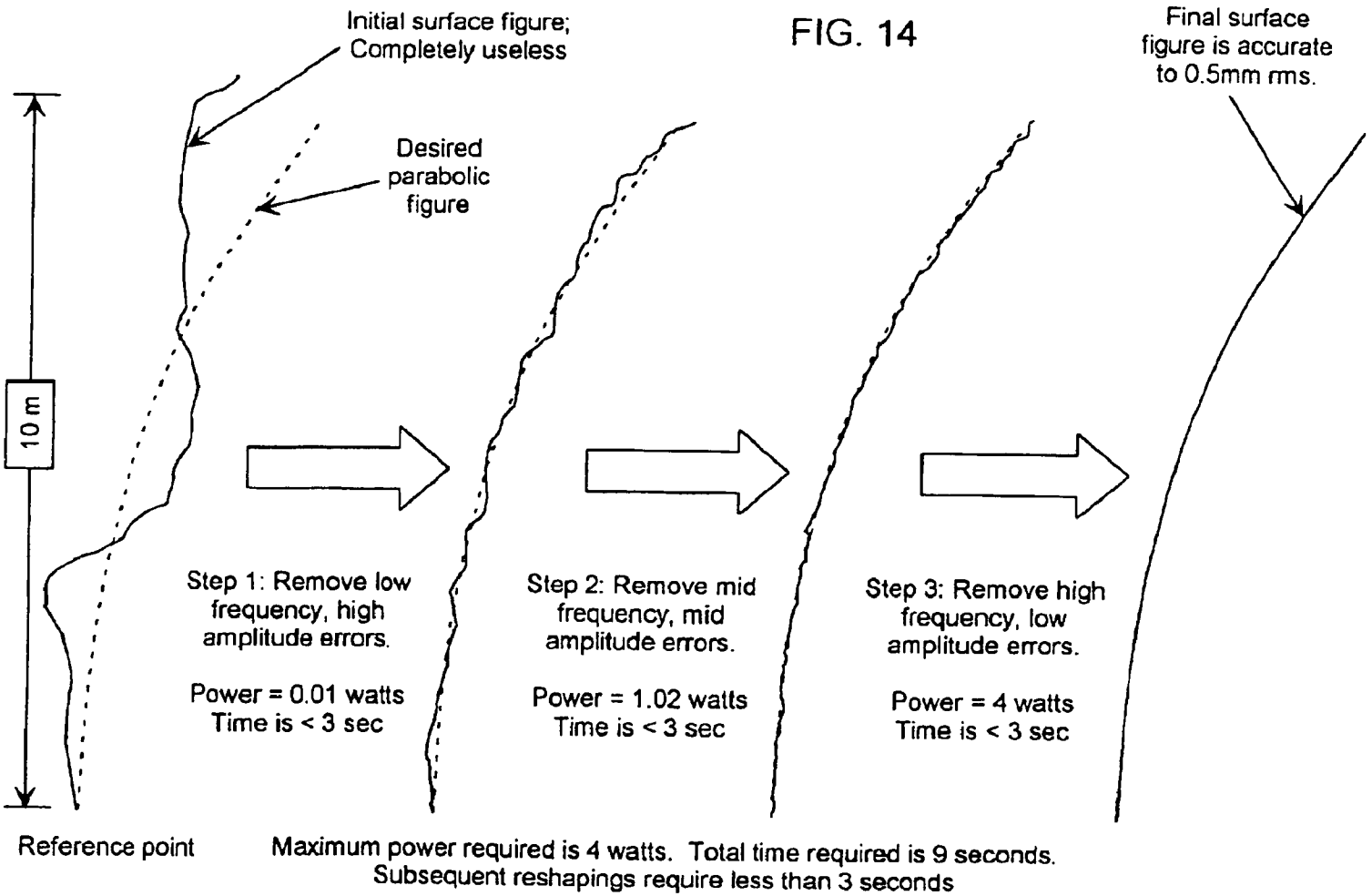
FIG. 14 illustrates shaping of a 10 m×100 m X-band reflector according to the present invention.

FIG. 14 illustrates shaping of a 10 m×100 m X-band reflector according to the present invention. At Step 1, low frequency, high amplitude errors are removed (e.g., power=0.01 watts, time is <3 seconds) from the initial surface figure. At Step 2, mid frequency, mid amplitude errors are removed (e.g., power=1.02 watts, time is <3 seconds). At Step 3, high frequency, low amplitude errors are removed (e.g., power=4 watts, time is <3 seconds) resulting in a final surface figure which is accurate to 0.5 mm rms. Maximum power required is 4 watts. Total time required is 9 seconds. Subsequent reshapings require less than 3 seconds.

Figure 16:
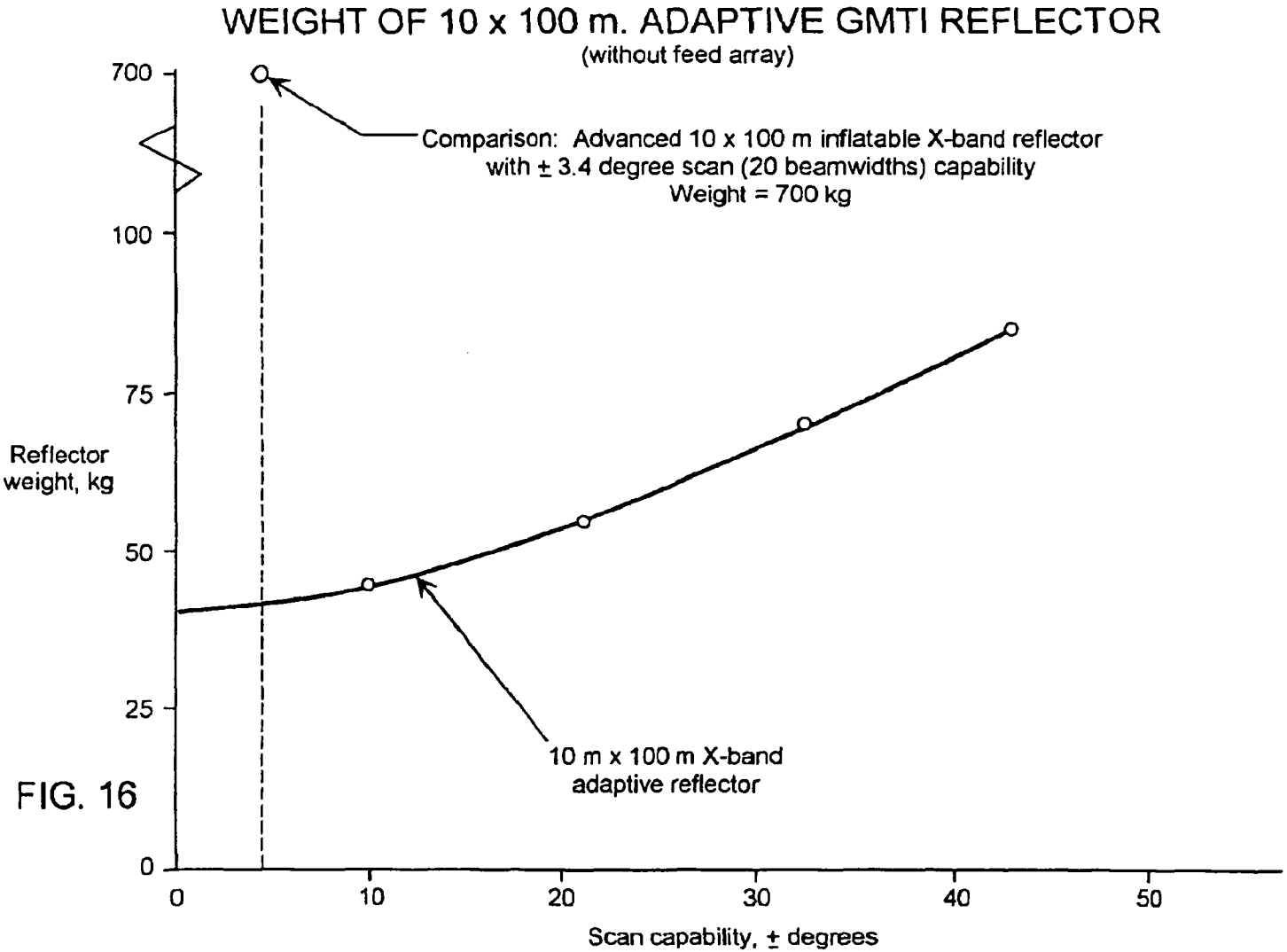
FIG. 16 is a plot of 10 m×100 m adaptive GMTI reflector weight (without feed array) versus scan capability.

FIG. 16 is a plot of 10 m×100 m adaptive GMTI reflector weight (without feed array) versus scan capability. For a 25 micron (1 mil) adaptive sandwich grid of 55% reflector substrate area, the weight is 0.028 kg/m$^2$. For a deposited uniform aluminum mesh, 17 μ thick, 14μ wide, λ/2 grid spacing, the weight is 0.00009 kg/m$^2$. This yields a total reflector weight of 0.02809 kg/m$^2$. Accordingly, the weight for a 10 m×100 m (1,000 m$^2$) reflector is 28 kg. Assuming that five electron beam generators and optical figure sensors weigh ~10 kg and that two tensioned side support beams weigh <5 kg, the reflector weight, including structure, for 10 m×100 m (1,000 m$^2$) is ~43 kg. If thinner substrates are employed, this weight may be further reduced.

By way of comparison, an advanced 10 m×100 m inflatable X-band reflector with ±3.4 degree scan (20 beamwidths)

capability weighs 700 kg. Adding a feed array weight (2D array) of 275 kg and STAP weight and power of 25 kg+1 kW (equivalent to 35 kg total) results in a total antenna and processor weight of 1,010 kg. In contrast, for the 10 m×100 m adaptive GMTI reflector with ±40+ degree scan of the present invention, which has a reflector weight, including structure, of 43 kg, adding a feed array weight (line array) of 95 kg and a STAP weight of 0 kg results in a total antenna and processor weight of 138 kg. Thus, for GMTI, implementation of the present invention: saves 872 kg, and allows for a much simpler, lighter array and processing; potentially reduces clutter and allows for a lower target Minimum Detectable Velocity; and allows for much greater scanning, possibly reducing S/C number, altitude.

Figures 18A, 18B:
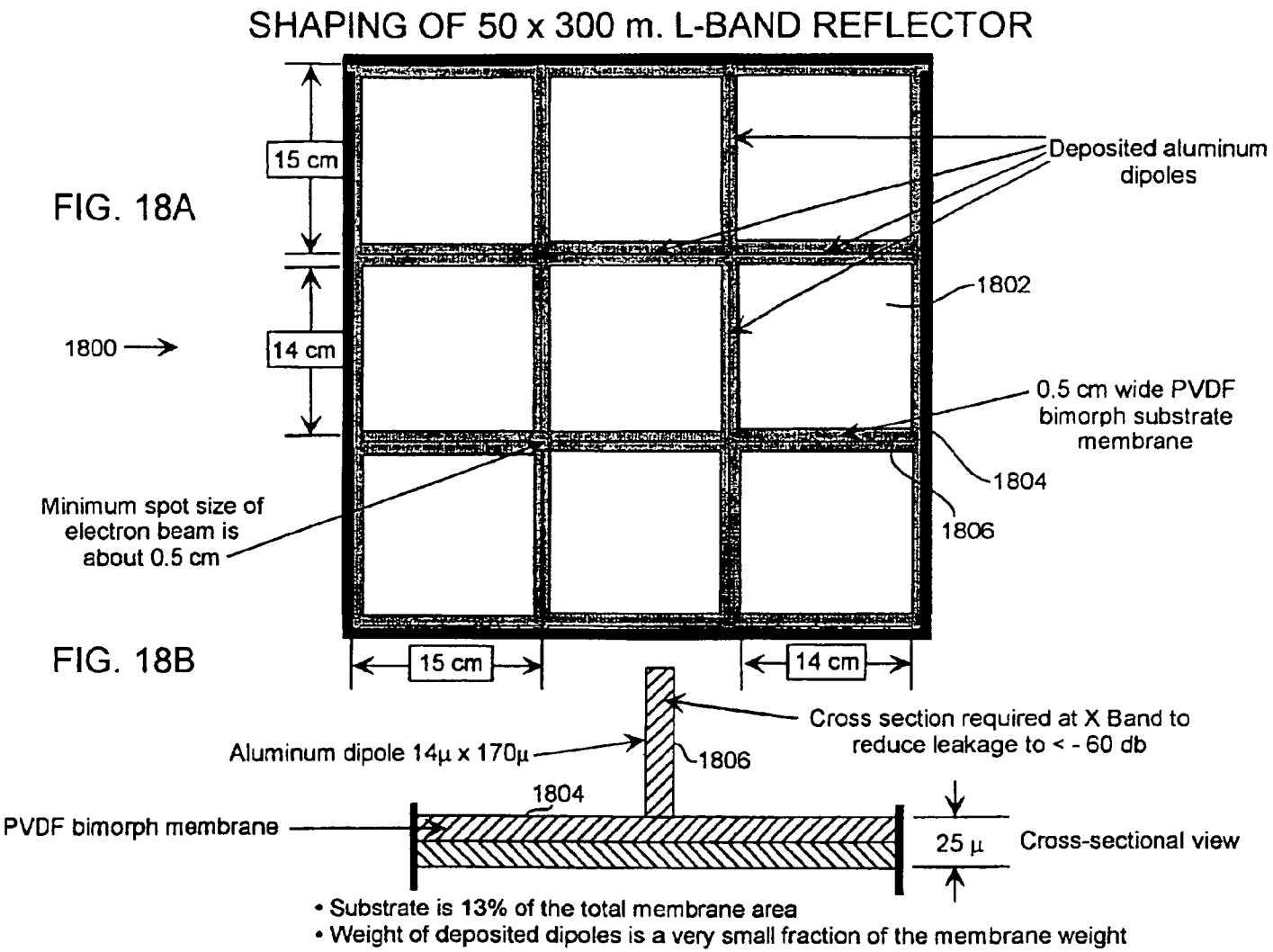
FIGS. 18A and 18B illustrate an example of an airborne moving target indication (AMTI) L-band adaptive reflector construction according to the present invention.

FIGS. 18A and 18B illustrate an example of an airborne moving target indication (AMTI) L-band adaptive reflector construction according to the present invention. An adaptive reflector 1800 suitable for AMTI L-band includes a membrane 1802, with a bimorph substrate 1804, and a reflector structure 1806 formed over the bimorph substrate 1804. In this example, the substrate 1804 is 13% of the total membrane area, and is formed in a grid configuration as shown from 0.5 cm wide PVDF strips with a matte surface finish for reflecting the figure sensor laser. For an antenna employing the adaptive reflector 1800, the beam scanning mechanism is configured to generate an electron beam with a minimum spot size that is a function of the width of the strips. In this example, the minimum spot size of the electron beam is about 0.5 cm. The reflector structure 1806 is formed as a plurality of dipoles centrally positioned along portions of the bimorph substrate 1804 as shown. In this example, the dipoles are deposited aluminum and have a cross-section (14μ×170μ) which, at L-band, reduces leakage to <−60 dB.

The above-described AMTI adaptive reflector is suitable for a 50 m×300 m array-fed (simple one-dimensional line array) parabolic cylinder reflector that is attached to the feed with minimal structure to eliminate stationkeeping. The larger aperture allows for the elimination of Unmanned Aerial Vehicle (UAV) receivers without power increase. This adaptive reflector also results in a smaller minimum detectable target cross-section. For an antenna employing such an adaptive reflector, less clutter processing is required: Space-Time Adaptive Processing (STAP) is reduced or eliminated.

Operating at L-band does not stress surface requirements. Rms surface roughness of 0.75 mm is needed to limit gain reduction to <1 db. This is an accuracy of 0.0075 m in 300 m, or 1 part in 40,000. This is very difficult for passive structures: requires active systems. As discussed below, L-band operation is also an exemplary application for the adaptive reflector technology of the present invention.

Figure 17:
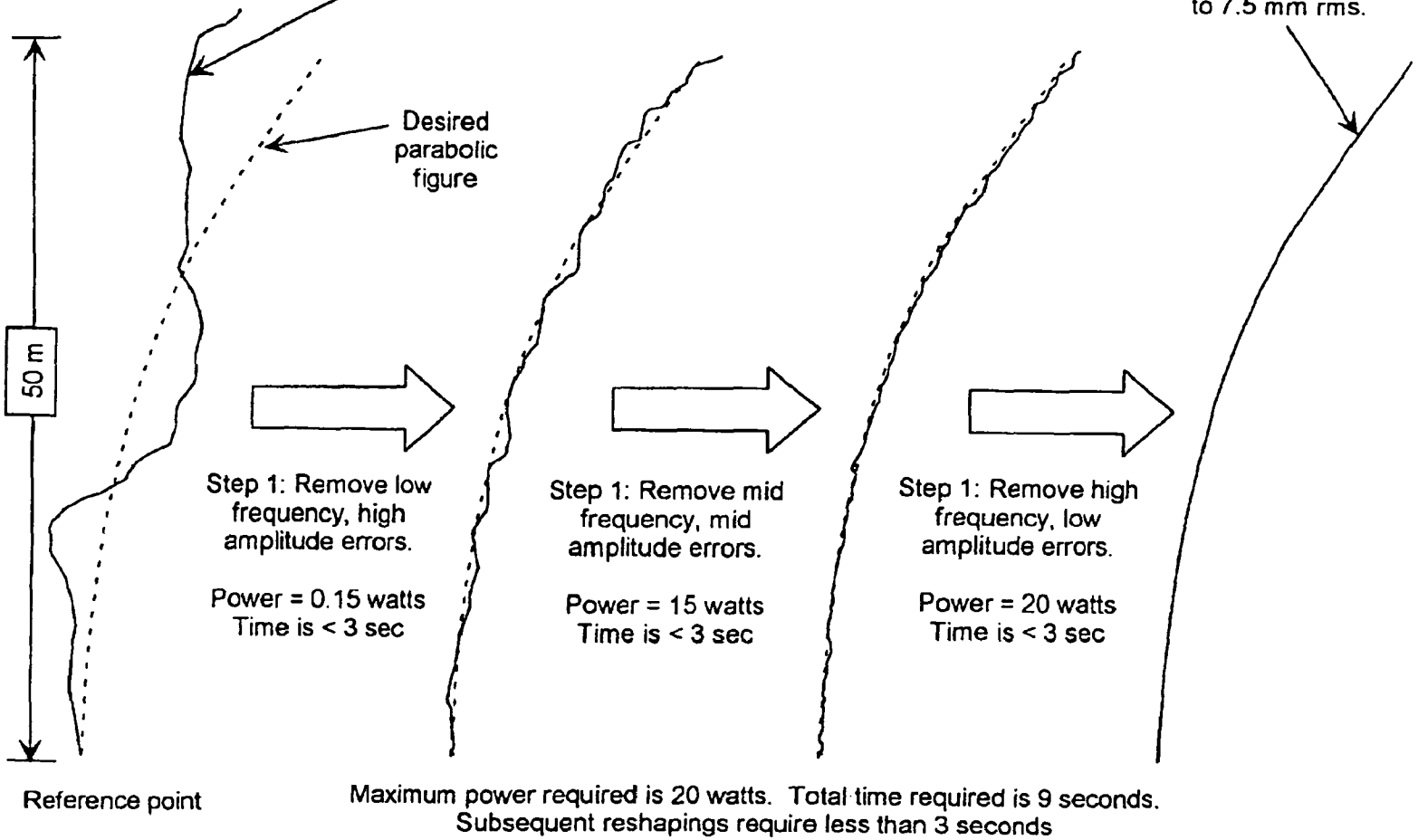
FIG. 17 illustrates shaping of a 50 m×300 m L-band reflector according to the present invention.

FIG. 17 illustrates shaping of a 50 m×300 m L-band reflector according to the present invention. At Step 1, low frequency, high amplitude errors are removed (e.g., power=0.15 watts, time is <3 seconds) from the initial surface figure. At Step 2, mid frequency, mid amplitude errors are removed (e.g., power=15 watts, time is <3 seconds). At Step 3, high frequency, low amplitude errors are removed (e.g., power=20 watts, time is <3 seconds) resulting in a final surface figure which is accurate to 7.5 mm rms. Maximum power required is 20 watts. Total time required is 9 seconds. Subsequent reshapings require less than 3 seconds.

Figure 19:
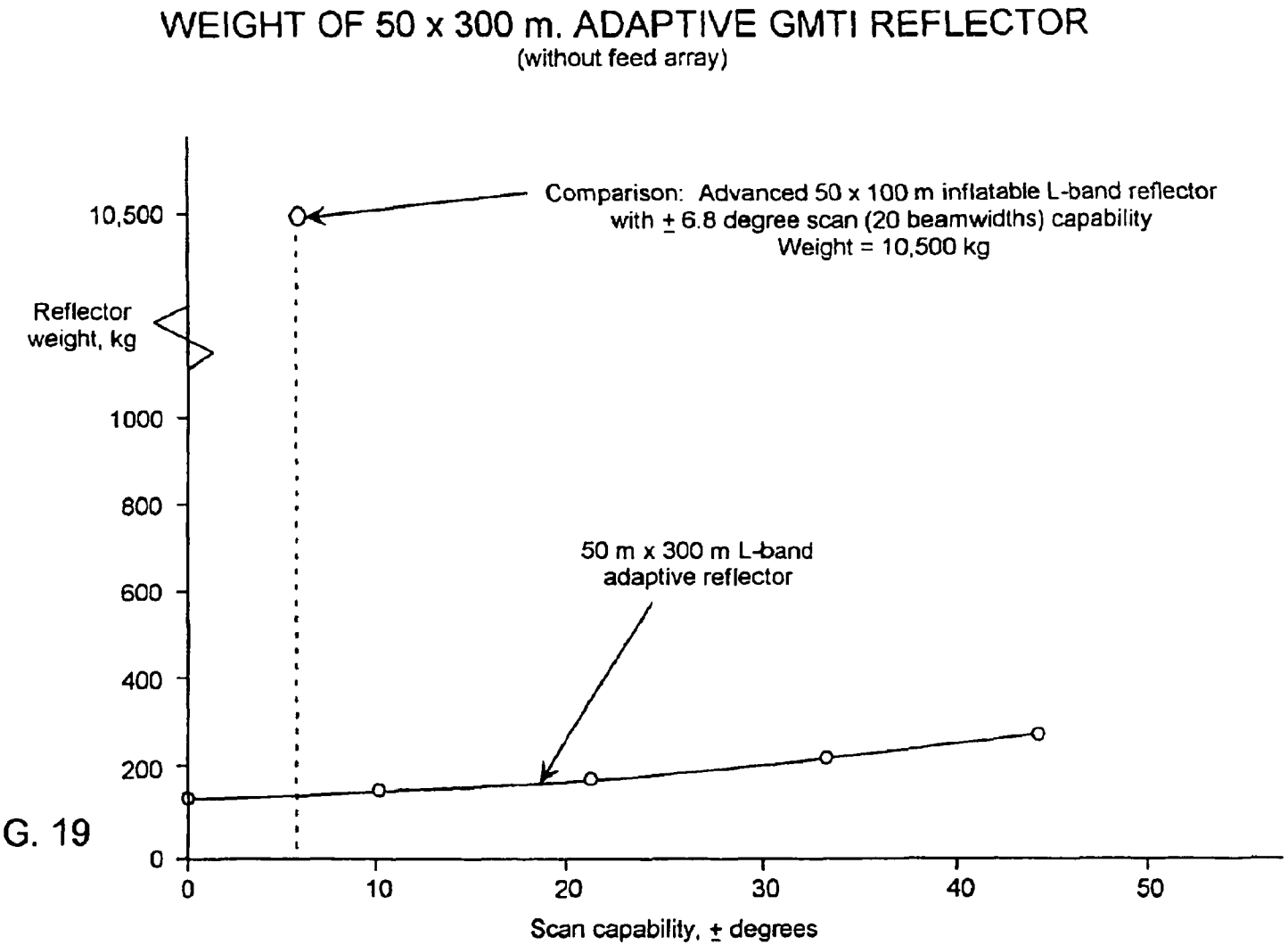
FIG. 19 is a plot of 50 m×300 m adaptive AMTI reflector weight (without feed array) versus scan capability.

FIG. 19 is a plot of 50 m×300 m adaptive AMTI reflector weight (without feed array) versus scan capability. For a 25 micron (1 mil) adaptive sandwich grid of 13% reflector substrate area, the weight is 0.0065 kg/m$^2$. For a deposited uniform aluminum mesh, 170μ thick, 14μ wide, λ/2 grid spacing, the weight is 0.00009 kg/m$^2$. This yields a total reflector weight of 0.00659 k/m$^2$. Accordingly, the weight for a 50 m×300 m (15,000 m$^2$) reflector is 98 kg. Assuming that five electron beam generators and optical figure sensors weigh ~25 kg and that two tensioned side support beams weigh <25 kg, the reflector weight, including structure, for 50 m×300 m (15,000 m$^2$) is ~148 kg. If thinner substrates are employed, this weight may be further reduced.

By way of comparison, an advanced 50 m×300 m inflatable L-band reflector with ±6.8 degree scan (20 beamwidths) capability weighs 10,500 kg. Adding a feed array weight (2D array) of 2,770 kg and STAP weight and power of 25 kg+1 kW (equivalent to 35 kg total) results in a total antenna and processor weight of 13,305 kg. In contrast, for the 50 m×300 m adaptive AMTI reflector with ±40+ degree scan of the present invention, which has a reflector weight, including structure, of 148 kg, adding a feed array weight (line array) of 275 kg and a STAP weight of 0 kg results in a total antenna and processor weight of 423 kg. Thus, for AMTI, implementation of the present invention: saves 12,882 kg, and allows for a much simpler, lighter array and processing; potentially eliminates UAVs and reduces minimum detectable target size; and allows for much greater scanning, possibly reducing S/C number, altitude.

Additionally, it should be understood that the principles of the present invention are applicable to both optical and RF apertures. Moreover, the membrane reflector can be actuated by a beam mechanism other than electron beams, or even by wire-actuated or other remote means-actuated areas on the membrane.

Although the present invention has been described in terms of the embodiment(s) above, numerous modifications and/or additions to the above-described embodiment(s) would be readily apparent to one skilled in the art. It is intended that the scope of the present invention extends to all such modifications and/or additions.

I claim:

1. An adaptive reflector antenna, comprising:

an adaptive reflector; and means for simultaneously effecting feed rotation and shape change for the adaptive reflector.

2. The adaptive reflector antenna of claim 1, wherein the means for simultaneously effecting feed rotation and shape change includes an illuminating beam scanner configured to adjust a shape of the adaptive reflector in response to an optical figure sensor.

3. The adaptive reflector antenna of claim 2, wherein the illuminating beam scanner includes a line feed array.

4. The adaptive reflector antenna of claim 2, wherein the illuminating beam scanner includes a slotted waveguide.

5. The adaptive reflector antenna of claim 2, wherein the illuminating beam scanner includes a rotatable line feed.

6. The adaptive reflector antenna of claim 2, wherein the illuminating beam scanner includes a fixed line feed with a rotatable auxiliary reflector.

7. The adaptive reflector antenna of claim 6, wherein the auxiliary reflector rotates mechanically.

8. The adaptive reflector antenna of claim 6, wherein the auxiliary reflector rotates piezoelectrically.

9. The adaptive reflector antenna of claim 2, wherein the means for simultaneously effecting feed rotation and shape change is configured such that illuminated reflector shape is adjusted as offset angle and tilt are applied so as to appear as on-axis reflector to the feed.

10. The adaptive reflector antenna of claim 2, wherein the means for simultaneously effecting feed rotation and shape change is configured such that antenna gain and sidelobe levels remain constant as scan angle is changed.

11. A method for implementing an adaptive reflector antenna, comprising the step of:

operatively coupling line feed rotation and reflector shaping for an adaptive off-axis reflector of a parabolic cylinder antenna such that each reflector shaping creates an identical on-axis parabolic shape for the portion of the reflector then illuminated by the line feed rotation.

12. The method for implementing an adaptive reflector antenna of claim 11, wherein the step of operatively coupling line feed rotation and reflector shaping includes co-locating optical figure sensors and electron beam generators of the adaptive reflector antenna.

13. An adaptive reflector antenna, comprising:

a membrane including a bimorph substrate;

a reflector structure formed over the bimorph substrate;

an optical figure sensor; and a beam scanning mechanism configured to simultaneously effect rotation of a feed and adaptively actuate in real time a shape of the membrane in response to an output of the optical figure sensor such that the reflector structure being illuminated by the feed always appears to the feed as an on-axis reflector of original shape as scan angle is changed.

14. The adaptive reflector antenna of claim 13, wherein the membrane is configurable as a parabolic cylinder antenna.

15. The adaptive reflector antenna of claim 13, wherein the reflector structure includes a conductive grid on the bimorph substrate.

16. The adaptive reflector antenna of claim 13, wherein the reflector includes a plurality of dipoles centrally positioned along portions of the bimorph substrate.

17. The adaptive reflector antenna of claim 16, wherein the dipoles are formed from aluminum.

18. The adaptive reflector antenna of claim 16, wherein the dipoles have a cross-section which, at X-band, reduces leakage.

19. The adaptive reflector antenna of claim 16, wherein the dipoles have a cross-section which, at L-band, reduces leakage.

20. The adaptive reflector antenna of claim 13, wherein:

the bimorph substrate is formed as a grid of strips which are uniform in width; and the beam scanning mechanism is configured to generate an electron beam with a minimum spot size that is a function of the width of the strips.

*21. An adaptive reflector antenna, comprising:*

*a membrane including a bimorph substrate;*

*a reflector structure formed over the bimorph substrate;*

*an optical figure sensor; and*

*a beam scanning mechanism configured to rotate a feed, illuminate the reflector structure and adaptively shape the membrane in response to an output of the optical figure sensor such that the reflector structure appears to the feed as an on-axis reflector of original shape as scan angle is changed.*

*22. The adaptive reflector antenna of claim 21, wherein the membrane is configurable as a parabolic cylinder antenna.*

*23. The adaptive reflector antenna of claim 21, wherein the reflector structure includes a conductive grid on the bimorph substrate.*

*24. The adaptive reflector antenna of claim 21, wherein the reflector includes a plurality of dipoles centrally positioned along portions of the bimorph substrate.*

*25. The adaptive reflector antenna of claim 24, wherein the dipoles are formed from aluminum.*

*26. The adaptive reflector antenna of claim 24, wherein the dipoles have a cross-section which, at X-band, reduces leakage.*

*27. The adaptive reflector antenna of claim 24, wherein the dipoles have a cross-section which, at L-band, reduces leakage.*

*28. The adaptive reflector antenna of claim 21, wherein: the bimorph substrate is formed as a grid of strips which are uniform.*

*29. A method for constructing an adaptive reflector antenna, comprising:*

*forming an adaptive reflector structure over a membrane with a bimorph substrate;*

*locating an optical figure sensor on one side of the reflector structure;*

*locating an electron beam feed and back potential generator on another side of the reflector structure that is opposite the optical figure sensor;*

*illuminating and scanning both the reflector structure and optical sensor with the electron beam feed;*

*providing an output from the optical figure sensor to the electron beam feed and back potential generator; and*

*adaptively shaping the membrane in response to the output of the optical figure sensor,*

*wherein the electron beam feed and the optical sensor provide closed loop control that sets and maintains a curvature and original shape of the reflector structure in the presence of disturbances, and*

*wherein the adaptive reflector structure illuminated by the electron beam feed appears as an on-axis reflector of the original shape as a scan angle is changed.*

*30. The method of claim 29, wherein the membrane is configurable as a parabolic cylinder antenna.*

*31. The method of claim 29, wherein the reflector structure includes a conductive grid on the bimorph substrate.*

*32. The method of claim 29, wherein the reflector includes a plurality of dipoles centrally positioned along portions of the bimorph substrate.*

*33. The method of claim 32, wherein the dipoles are formed from aluminum.*

*34. The method of claim 32, wherein the dipoles have a cross-section which, at X-band, reduces leakage.*

*35. The method of claim 32, wherein the dipoles have a cross-section which, at L-band, reduces leakage.*

*36. The method of claim 29, wherein the bimorph substrate is formed as a grid of strips which are uniform.*

* * * * *

UNITED STATES PATENT AND TRADEMARK OFFICE

CERTIFICATE OF CORRECTION

PATENT NO. : RE43,498 E
APPLICATION NO. : 11/797368
DATED : July 3, 2012
INVENTOR(S) : Bekey It is certified that error appears in the above-identified patent and that said Letters Patent is hereby corrected as shown below:

In Column 1, Line 18, delete “arc” and insert -- are --, therefor.

In Column 2, Line 24, delete “of first” and insert -- of a first --, therefor.

In Column 6, Line 24, delete “beamforming” and insert -- beam-forming --, therefor.

In Column 8, Line 1, delete “$k/m^2$.” and insert -- $kg/m^2$. --, therefor.

Signed and Sealed this
Eighteenth Day of December, 2012

David J. Kappos

David J. Kappos
*Director of the United States Patent and Trademark Office*